United States Patent
Hsiao et al.

(10) Patent No.: US 11,929,681 B2
(45) Date of Patent: Mar. 12, 2024

(54) SCALABLE MULTI-PHASE SWITCHING CONVERTER AND CONVERTER MODULE AND CONTROL METHOD THEREOF

(71) Applicant: Richtek Technology Corporation, Zhubei (TW)

(72) Inventors: Chih-Wen Hsiao, Hsinchu (TW); Ping-Ching Huang, Taipei (TW); Li-Wen Fang, Taipei (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 266 days.

(21) Appl. No.: 17/669,431

(22) Filed: Feb. 11, 2022

(65) Prior Publication Data
US 2022/0271668 A1    Aug. 25, 2022

(30) Foreign Application Priority Data

Feb. 24, 2021  (TW) .................................. 110106529

(51) Int. Cl.
*H02M 3/158* (2006.01)
*H02M 1/08* (2006.01)

(52) U.S. Cl.
CPC .......... *H02M 3/1586* (2021.05); *H02M 1/08* (2013.01)

(58) Field of Classification Search
CPC ............................. H02M 3/1586; H02M 1/08
See application file for complete search history.

(56) References Cited

U.S. PATENT DOCUMENTS

| 2015/0016159 A1* | 1/2015 | Deboy | H02M 7/53873 363/71 |
| 2017/0060154 A1* | 3/2017 | Ozawa | H02M 3/1584 |
| 2020/0218301 A1* | 7/2020 | Lidsky | H02M 3/1584 |

* cited by examiner

Primary Examiner — Kyle J Moody
(74) Attorney, Agent, or Firm — Tung & Associates

(57) ABSTRACT

A scalable multi-phase switching converter includes: converter modules, each including: a loop control unit, which generates a basic trigger pulse according to a feedback signal in master operation mode; and a switching control unit, which determines an operation mode and a corresponding phase serial order according to a setting signal received by a setting pin in a setting mode, and generates a multi-phase trigger pulse signal at a trigger pin according to the basic trigger pulse in master operation mode. The switching control unit receives the multi-phase trigger pulse signal at the trigger pin in slave operation mode. The switching control unit generates an ON-trigger pulse according to the multi-phase trigger pulse signal and the corresponding phase serial order. An ON-period determination unit generates a conduction control pulse according to the ON-trigger pulse to control a corresponding inductor. The trigger pins of the converter modules are coupled to each other.

38 Claims, 9 Drawing Sheets

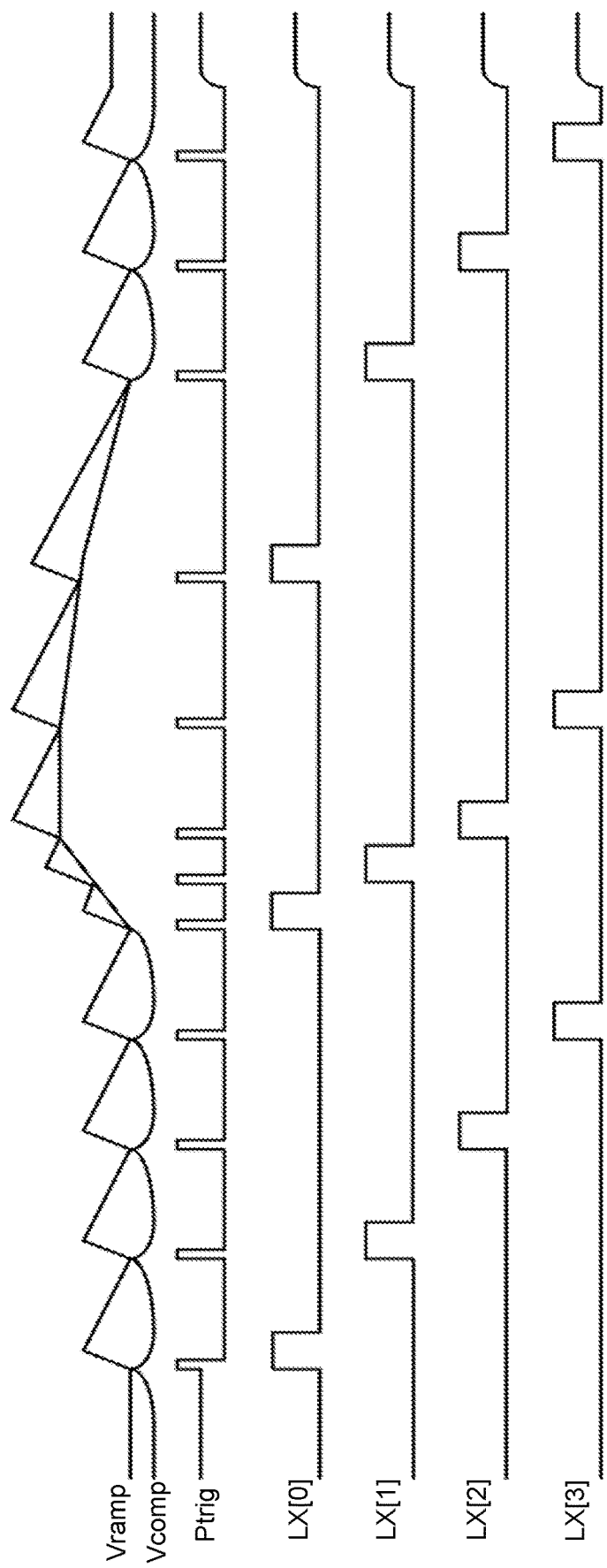

SCALABLE MULTI-PHASE SWITCHING CONVERTER AND CONVERTER MODULE AND CONTROL METHOD THEREOF

CROSS REFERENCE

The present invention claims priority to TW 110106529 filed on Feb. 24, 2021.

BACKGROUND OF THE INVENTION

Field of Invention

The present invention relates to a multi-phase switching converter; particularly, it relates to a scalable multi-phase switching converter. The present invention also relates to a converter module and a control method of such scalable multi-phase switching converter.

Description of Related Art

Please refer to FIG. 1, which shows a schematic diagram of a conventional multi-phase switching converter 10. This prior art multi-phase switching converter 10 operates as follows. As shown in FIG. 1, a controller 101 cooperate with plural driver switch units 102[1]~102[n]. The controller 101 generates plural conduction control pulses Poc[1]~Poc[n] according to a feedback signal related to an output voltage, and the controller 101 sequentially outputs the conduction control pulses Poc[1]~Poc[n] to corresponding output phases. The output phases are controlled by corresponding driver switch units 102[1]~102[n], to generate the output voltage. Such prior art configuration requires a high number of components for the driver switch units 102[1]~102[n] and a large layout area. If it is intended to integrate the driver switch units 102[1]~102[n] into an integrated circuit (IC), such as into the controller 101, when the number of the operation phases is larger than a certain extent, the IC size and heat dissipation will become a severe issue. Besides, the number of operation phases of the controller 101 is fixed. If an application requires to use a different number of operation phases, the controller needs to be redesigned.

In view of the above, to overcome the drawbacks in the prior art, the present invention proposes a modularized and scalable multi-phase switching converter and a converter module and a control method thereof.

SUMMARY OF THE INVENTION

From one perspective, the present invention provides a scalable multi-phase switching converter, comprising: a plurality of converter modules, which are correspondingly coupled to a plurality of inductors and which are configured to operably convert an input voltage to an output voltage by alternating multi-phase switching, wherein the plurality of converter modules are operable in and switchable among a plurality of operation modes, wherein each converter module includes: a loop control unit, which is configured to operably generate a basic trigger pulse according to a feedback signal in master operation mode; a setting pin, which is configured to operably receive a setting signal; a trigger pin, which is configured to operably transmit or receive a multi-phase trigger pulse signal; a switching control unit, which is configured to operably determine an operation mode and a phase serial order according to the setting signal in a setting mode, and wherein in master operation mode, the switching control unit is configured to operably generate the multi-phase trigger pulse signal at the trigger pin according to the basic trigger pulse, and wherein in slave operation mode, the switching control unit is configured to operably receive the multi-phase trigger pulse signal at the trigger pin, and wherein the switching control unit is configured to operably generate an ON-trigger pulse according to the multi-phase trigger pulse signal and the phase serial order; and an ON-period determination unit, which is configured to operably generate a conduction control pulse according to the ON-trigger pulse, so as to control a corresponding one of the inductors to generate the output voltage; wherein the trigger pins of the converter modules are coupled to each other.

In one embodiment, each converter module further includes: a driver switch unit including: a plurality of power switches, which are coupled to a corresponding inductor and which are controlled according to the conduction control pulse, so as to control the corresponding inductor to generate the output voltage.

In one embodiment, the conduction control pulse has a constant ON-period.

In one embodiment, the ON-period determination unit is further configured to operably adjust the constant ON-period according to a current of the corresponding inductor, so that the currents of the inductors achieve current balance.

In one embodiment, the trigger pin of each converter module is one and the only one trigger pin of the converter module, and wherein the multi-phase trigger pulse signal is the only one multi-phase trigger signal received by the converter module.

In one embodiment, the feedback signal is correlated with the output voltage.

In one embodiment, the phase serial order of each converter module operating in master operation mode or in slave operation mode corresponds to a predetermined level range, wherein the switching control unit corresponding to the converter module is configured to operably compare a level of the multi-phase trigger pulse signal with the predetermined level range, so as to determine a time point to trigger the ON-trigger pulse.

In one embodiment, the converter module operating in master operation mode is configured to dynamically adjust a number of operation phases of the scalable multi-phase switching converter by controlling the level of the multi-phase trigger pulse signal.

In one embodiment, each switching control unit operating in master operation mode or in slave operation mode is configured to operably count a serial order of pulses in the multi-phase trigger pulse signal, and control the corresponding power switches when a pulse of a corresponding serial order in the multi-phase trigger pulse signal is triggered.

In one embodiment, the multi-phase trigger pulse signal includes a reset state, wherein each converter module is configured to operably reset the counted serial order according to the reset state.

In one embodiment, the switching control unit operating in master operation mode is configured to operably control the multi-phase trigger pulse signal to be at a high impedance state in response to the reset state.

In one embodiment, a reset state is inserted between every two multi-phase cycles of pulses.

In one embodiment, the converter module operating in master operation mode is further configured to operably determine a total number of operation phases of the scalable multi-phase switching converter according to the setting signal.

In one embodiment, the converter module operating in master operation mode is further configured to adaptively adjust a total number of operation phases of the scalable multi-phase switching converter according to an output current.

In one embodiment, each converter module is packaged into an integrated circuit (IC) package, wherein the IC package includes: the setting pin and the trigger pin, for communication with an external circuit outside the IC package.

In one embodiment, the loop control unit in slave operation mode is controlled to be disabled.

From another perspective, the present invention provides a converter module, which is configured to form a scalable single-phase switching converter or a scalable multi-phase switching converter, wherein the converter module is coupled to an inductor so as to convert an input voltage to an output voltage; the converter module comprising: a loop control unit, which is configured to operably generate a basic trigger pulse according to a feedback signal in master operation mode; a setting pin, which is configured to operably receive a setting signal; a trigger pin, which is configured to operably transmit or receive a multi-phase trigger pulse signal; a switching control unit, which is configured to operably determine an operation mode and a phase serial order according to the setting signal in a setting mode, and wherein in master operation mode, the switching control unit is configured to operably generate the multi-phase trigger pulse signal at the trigger pin according to the basic trigger pulse, and wherein in slave operation mode, the switching control unit is configured to operably receive the multi-phase trigger pulse signal at the trigger pin, and wherein the switching control unit is configured to operably generate an ON-trigger pulse according to the multi-phase trigger pulse signal and the phase serial order; and an ON-period determination unit, which is configured to operably generate a conduction control pulse according to the ON-trigger pulse, so as to control a corresponding one of the inductors to generate the output voltage.

In one embodiment, the converter module further comprises: a driver switch unit including: a plurality of power switches, which are coupled to a corresponding inductor and which are controlled according to the conduction control pulse, so as to control the corresponding inductor to generate the output voltage.

In one embodiment, the conduction control pulse has a constant ON-period.

In one embodiment, the trigger pin of each converter module is one and the only one trigger pin of the converter module, and wherein the multi-phase trigger pulse signal is the only one multi-phase trigger signal received by the converter module.

In one embodiment, the phase serial order of each converter module operating in master operation mode or in slave operation mode corresponds to a predetermined level range, wherein the switching control unit corresponding to the converter module is configured to operably compare a level of the multi-phase trigger pulse signal with the predetermined level range, so as to determine a time point to trigger the ON-trigger pulse.

In one embodiment, the converter module operating in master operation mode is configured to dynamically adjust a number of operation phases of the scalable multi-phase switching converter by controlling the level of the multi-phase trigger pulse signal.

In one embodiment, each switching control unit operating in master operation mode or in slave operation mode is configured to operably count a serial order of pulses in the multi-phase trigger pulse signal, and control the corresponding power switches when a pulse of a corresponding serial order in the multi-phase trigger pulse signal is triggered.

In one embodiment, the multi-phase trigger pulse signal includes a reset state, wherein each converter module is configured to operably reset the serial order of counting according to the reset state.

In one embodiment, the switching control unit operating in master operation mode is configured to operably control the multi-phase trigger pulse signal to be at a high impedance state in response to the reset state.

In one embodiment, the converter module operating in master operation mode is further configured to operably determine a total number of operation phases of the scalable multi-phase switching converter according to the setting signal.

In one embodiment, the converter module operating in master operation mode is further configured to adaptively adjust a total number of operation phases of the scalable multi-phase switching converter according to an output current.

In one embodiment, each converter module is packaged into an integrated circuit (IC) package, wherein the IC package includes: the setting pin and the trigger pin, for communication with an external circuit outside the IC package.

In one embodiment, the loop control unit in slave operation mode is controlled to be disabled.

In one embodiment, in the setting mode, the switching control unit is further configured to operably determine the operation mode as a single-phase operation mode according to the setting signal, wherein in the single-phase operation mode, the switching control unit is configured to operably generate the ON-trigger pulse according to the basic trigger pulse.

From yet another perspective, the present invention provides a control method configured to operably control a scalable multi-phase switching converter, wherein the scalable multi-phase switching converter includes: a plurality of converter modules, which are correspondingly coupled to a plurality of inductors so as to operably convert an input voltage to an output voltage by alternating multi-phase switching; the control method comprising: in a setting mode, receiving a setting signal from a setting pin and determining an operation mode and a phase serial order according to the setting signal; in master operation mode, generating a basic trigger pulse according to a feedback signal and generating a multi-phase trigger pulse signal at a trigger pin according to the basic trigger pulse; in slave operation mode, receiving the multi-phase trigger pulse signal at the trigger pin; generating an ON-trigger pulse according to the multi-phase trigger pulse signal and the phase serial order; and generating a conduction control pulse according to the ON-trigger pulse, so as to control the plurality of inductors to generate the output voltage.

In one embodiment, the conduction control pulse has a constant ON-period.

In one embodiment, the trigger pin of each converter module is one and the only one trigger pin of the converter module, and wherein the multi-phase trigger pulse signal is the only one multi-phase trigger signal received by the converter module.

In one embodiment, the phase serial order of each converter module operating in master operation mode or in slave operation mode corresponds to a predetermined level range, wherein the switching control unit corresponding to the converter module is configured to operably compare a level of the multi-phase trigger pulse signal with the predetermined level range, so as to determine a time point to trigger the ON-trigger pulse.

In one embodiment, the step of generating the ON-trigger pulse includes: in master operation mode or in slave operation mode, counting a serial order of pulses in the multi-phase trigger pulse signal, so as to control corresponding power switches when a pulse of a corresponding serial order in the multi-phase trigger pulse signal is triggered.

In one embodiment, the multi-phase trigger pulse signal includes a reset state, wherein each converter module is configured to operably reset the counted serial order according to the reset state.

Advantages of the present invention include: that the present invention can execute control operation via one single trigger signal in the absence of a reset signal; that the present invention can operate to generate output by a non-constant frequency, wherein one converter module operating in master operation mode can provide the trigger signal to another converter module operating in slave operation mode according to loop response; that a setting signal can be inputted via an extra pin or a digital interface.

The objectives, technical details, features, and effects of the present invention will be better understood with regard to the detailed description of the embodiments below, with reference to the attached drawings.

BRIEF DESCRIPTION OF THE DRAWINGS

FIG. 7 illustrates a signal waveform diagram depicting the operation of a scalable multi-phase switching converter of FIG. 2.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
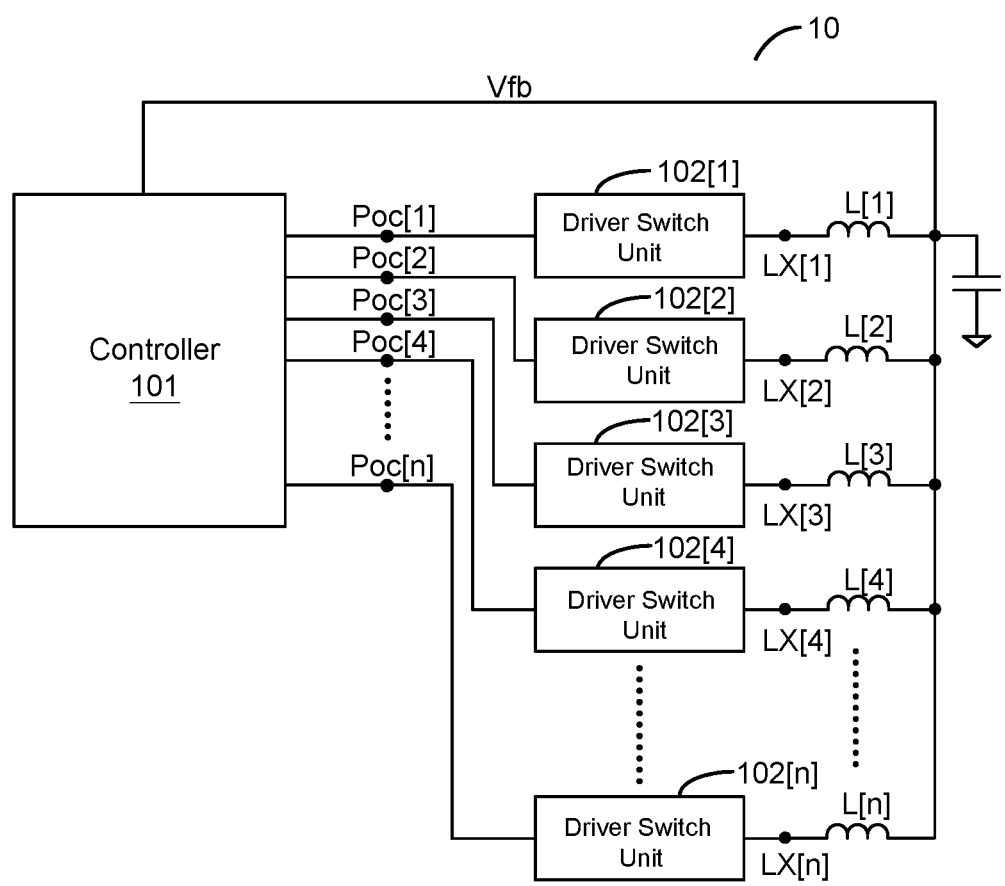
FIG. 1 shows a schematic diagram of a conventional multi-phase switching converter.
Figure 2:
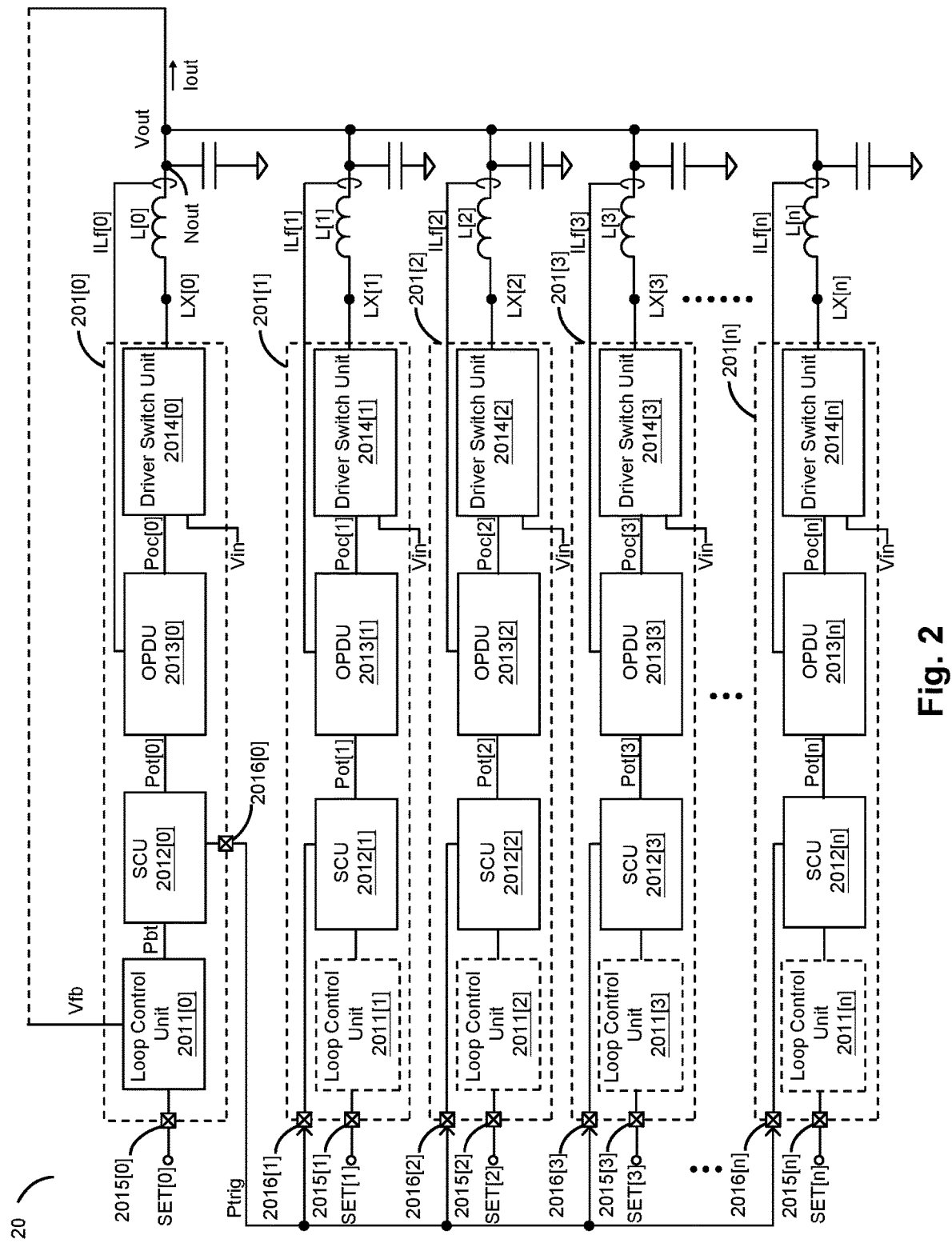
FIG. 2 shows a schematic block diagram of a scalable multi-phase switching converter according to an embodiment of the present invention.

Please refer to FIG. 2, which shows a schematic block diagram of a scalable multi-phase switching converter according to an embodiment of the present invention. As shown in FIG. 2, in one embodiment, the scalable multi-phase switching converter 20 of the present invention includes: converter modules 201[0]~201[n], which are correspondingly coupled to inductors L[0]~L[n] and which are configured to operably convert an input voltage Vin to an output voltage Vout by alternating multi-phase switching. Each converter module 201[0]~201[n] is configured to operably switch a first end (LX[0]~LX[n]) of a corresponding inductor L[0]~L[n]. The second end of each L[0]~L[n] is coupled to an output node Nout, where the output voltage Vout is generated. Each converter module 201[0]~201[n] includes: a corresponding loop control unit 2011[0]~2011[n], a corresponding setting pin 2015[0]~2015[n], a corresponding trigger pin 2016[0]~2016[n], a corresponding switching control unit (SCU) 2012[0]~2012[n] and a corresponding ON-period determination unit (OPDU) 2013[0]~2013[n].

Figure 3:
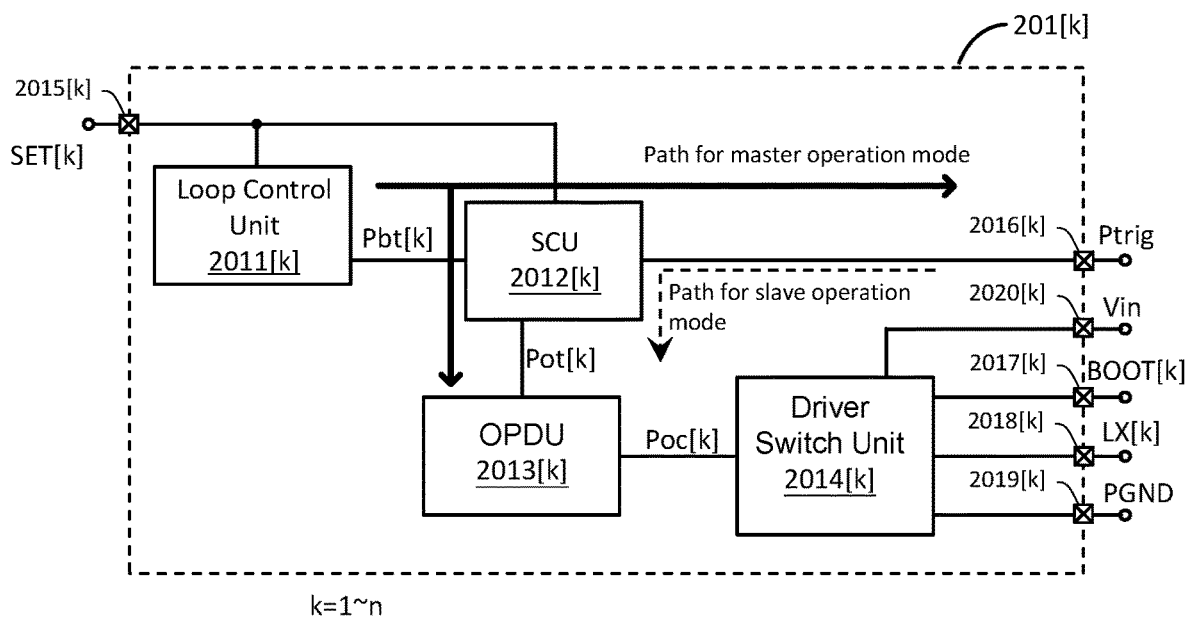
FIG. 3 shows an embodiment of a converter module in a scalable multi-phase switching converter according to the present invention.

Please refer to FIG. 2 in conjugation with FIG. 3. FIG. 3 shows an embodiment of a converter module in a scalable multi-phase switching converter according to the present invention. The converter module 201[k] is operable in and switchable among plural operation modes, whereby one converter module 201[k] can form a single-phase switching converter or plural converter modules 201[k] can form a multi-phase switching converter. When plural converter modules 201[k] form a multi-phase switching converter, the number of operation phases of the multi-phase switching converter can be flexibly scaled-up, wherein k=0~n, wherein n denotes a integer greater than or equal to zero. When n is equal to zero, it indicates that the converter module 201[k] is implemented to form a single-phase switching converter. When k is equal to zero, it indicates that this converter module 201[k] (i.e. 201[0]) is implemented as a single-phase switching converter (in this case n=0), or that plural converter modules 201[k] are implemented as a multi-phase switching converter (in this case n is larger than zero) and this converter module 201[0]) is operating in master operation mode. Besides, when k is greater than or equal to one, it indicates that plural converter modules 201[k] are implemented as a multi-phase switching converter and this converter module 201[k] is operating in slave operation mode.

Figure 8A:
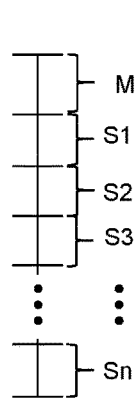
FIG. 8A and FIG. 8B show diagrams depicting two different settings of voltage levels of a setting signal, respectively.
Figure 8B:
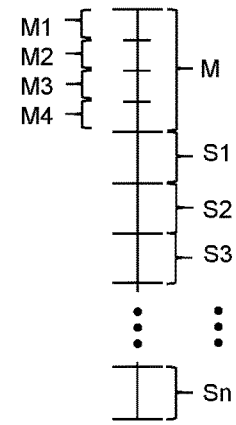

The setting pin 2015[k] is configured to receive a setting signal SET[k]. The trigger pin 2016[k] is configured to operably transmit or receive a multi-phase trigger pulse signal Ptrig. The switching control unit 2012[k] is configured to operably determine an operation mode and a phase serial order according to a setting signal SET[k] in a setting mode. The setting mode for example can be set when power on, or can be dynamically adjusted during the operation of the converter module 201[k]. Please refer to FIG. 2 and FIG. 3 in conjugation with FIG. 8A and FIG. 8B. FIG. 8A and FIG. 8B show diagrams depicting two different settings of voltage levels of a setting signal, respectively. In one embodiment, the converter module 201[k] can set different operation modes according to different voltage levels of a setting signal SET[k]. As shown in FIG. 8A, in this embodiment, when the voltage level of the setting signal SET[k] falls within a level range M, the switching control unit 2012[k] will determine that the converter module 201[k] operates in master operation mode. On the other hand, when the voltage level of the setting signal SET[k] falls within level ranges S1~Sn, the switching control unit 2012[k] will determine that the converter module 201[k] operates in slave operation mode. Besides, the switching control unit 2012[k] can further determine a corresponding phase serial order according to the voltage level of the setting signal SET[k]. For example, the phase serial order of a converter module 201[0] operating in master operation mode during multi-phase conversion operation is the first phase; the phase serial order of a converter module 201[1] operating in slave operation mode during multi-phase conversion operation is for example the second phase, because the voltage level of the corresponding setting signal SET[1] falls within the level range S1 (corresponding to a first module in slave operation mode), and so on.

Furthermore, in one embodiment, referring to FIG. 8B, when a converter module (e.g., converter module 201[0]) operates in master operation mode, the corresponding switching control unit 2012[0] of the converter module 201[0] can further determine a total number of operation phases according to which sub-level range (i.e., M1, M2, M3 and M4) the voltage level of the setting signal SET[k] falls within the level range M. For example, when the voltage level of the setting signal SET[0] falls within the sub-level range M1, it indicates that the converter module 201[0] is implemented as a single-phase switching converter (such as 120 in FIG. 12, the details of which will be described later). For another example, when the voltage level of the setting signal SET[0] falls within one of the sub-level ranges M2, M3 or M4, it indicates that there are plural converter modules forming a multi-phase switching converter, and the total number of operation phases is two, three or four, correspondingly.

Please refer to FIG. 2 and FIG. 3. The loop control unit in master operation mode (e.g., loop control unit 2011[0] in FIG. 2) is configured to operably generate a basic trigger pulse Pbt according to a feedback signal Vfb. In one embodiment, the feedback signal Vfb is correlated with the output voltage Vout; for example, in one embodiment, the feedback signal Vfb is a divided voltage of the output voltage Vout. In one embodiment, the loop control units 2011[1]~2011[n] in slave operation mode are disabled (e.g., loop control units 2011[1]~2011[n] are illustrated by dashed-line blocks).

Please refer to FIG. 2 and FIG. 3 in conjugation with FIG. 7. FIG. 7 illustrates a signal waveform diagram depicting the operation of a scalable multi-phase switching converter of FIG. 2. The switching control unit 2012[0] operating in master operation mode generates a multi-phase trigger pulse signal Ptrig at a trigger pin 2016[0] according to a basic trigger pulse Pbt. On the other hand, each switching control unit 2012[1]~2012[n] operating in slave operation mode receives the same multi-phase trigger pulse signal Ptrig at each respective trigger pin 2016[1]~2016[n]. In one embodiment, as shown in FIG. 7, the waveform of the basic trigger pulse Pbt corresponds to the waveform i of the multi-phase trigger pulse signal Ptrig. The multi-phase trigger pulse signal Ptrig generated by the switching control unit 2012[0] operating in master operation mode triggers the switching operations of all the converter modules 201[0]~201[n] corresponding to all operation phases.

To elaborate in more detail, in this embodiment, the switching control units 2012[0]~2012[n] in master operation mode and in slave operation mode (i.e., in a case when there are plural converter modules 201[k] configured as a multi-phase switching converter) respectively generate corresponding ON-trigger pulses Pot[0]~Pot[n] according to the same multi-phase trigger pulse signal Ptrig and respective phase serial orders.

Subsequently, the ON-period determination units 2013[0]~2013[n] respectively generate corresponding conduction control pulses Poc[0]~Poc[n] according to the ON-trigger pulses Pot[0]~Pot[n], so as to control the inductors L[0]~L[n] to thereby generate the output voltage Vout by alternating multi-phase switching. It is noteworthy that, in the present invention, in the scalable multi-phase switching converter 20, the trigger pins 2016[0]~2016[n] of the converter modules 201[0]~201[n] are coupled to each other. Besides, in one embodiment, in the scalable multi-phase switching converter 20, only one converter module (i.e., converter module 201[0]) operates in master operation mode.

As shown in FIG. 2 and FIG. 3, in one embodiment, each converter module 201[k] further includes a driver switch unit 2014[k]. The driver switch unit 2014[k] includes: plural power switches which are coupled to the corresponding inductors (e.g., L[k]) and which are operably controlled according to the corresponding conduction control pulse Poc[k], so as to control the inductors L[k] correspondingly to thereby generate the output voltage Vout. In one embodiment, each conduction control pulse Poc[0]~Poc[n] has a constant ON-period. In one embodiment, ON-periods of different operation phases can overlap with one another.

Besides, in one embodiment, each ON-period determination units 2013[0]~2013[n] further adjusts the corresponding constant ON-period according to a current of the corresponding inductor L[0]~L[n] (e.g., according to a corresponding inductor current feedback signal ILf[0]~ILf[n]), so that a certain ratio among the currents of the inductors L[0]~L[n] or current balance is achieved among the plural phases.

In one embodiment, the trigger pin 2016[0]~2016[n] of each converter module 201[0]~201[n] is one and the only one trigger pin of the corresponding converter module 201[0]~201[n] that transmits or receives a multi-phase trigger signal, and the multi-phase trigger pulse signal Ptrig is the only multi-phase trigger signal that each converter module 201[0]~201[n] transmits or receives. The converter module 201[0] transmits the multi-phase trigger pulse signal Ptrig via the trigger pin 2016[0]; the converter modules 201[1]~201[n] receive the multi-phase trigger pulse signal Ptrig via their corresponding trigger pins 2016[1]~2016[n] respectively. In one embodiment, the converter module 201[1]~201[n] receive the same multi-phase trigger pulse signal Ptrig.

In one embodiment, in master operation mode, the converter module 201[0] is configured to adaptively adjust the number of operation phases of the scalable multi-phase switching converter 20 according to an output current Iout. In one embodiment, the number of operation phases is increased as the output current Iout increases.

Please refer to FIG. 3, which shows an embodiment of a converter module in a scalable multi-phase switching converter according to the present invention. As shown in FIG. 3, in one embodiment, a switching control unit 2012[k] operating in master operation mode generates a multi-phase trigger pulse signal Ptrig at the corresponding trigger pin 2016[k] according to the basic trigger pulse Pbt[k] along a path for master operation mode as shown by solid line arrows in the figure. Additionally, the switching control unit 2012[k] operating in master operation mode further generates an ON-trigger pulse Pot[k] along the path for master operation mode and inputs the ON-trigger pulse Pot[k] to the ON-period determination units 2013[k]. Referring to FIG. 2, in this embodiment, k for example is zero.

On the other hand, a switching control unit 2012[k] operating in slave operation mode receives a multi-phase trigger pulse signal Ptrig at a trigger pin 2016[k] along a path for slave operation mode as shown by a dashed line arrow in FIG. 3. And, along the path for slave operation mode, the switching control unit 2012[k] operating in slave operation mode generates an ON-trigger pulse Pot[k] according to the received multi-phase trigger pulse signal Ptrig, and inputs the ON-trigger pulse Pot[k] to the ON-period determination units 2013[k]. Referring to FIG. 2, in this embodiment, k for example can be an integer ranging between 1 to n (i.e. k=1~n).

Figure 4:
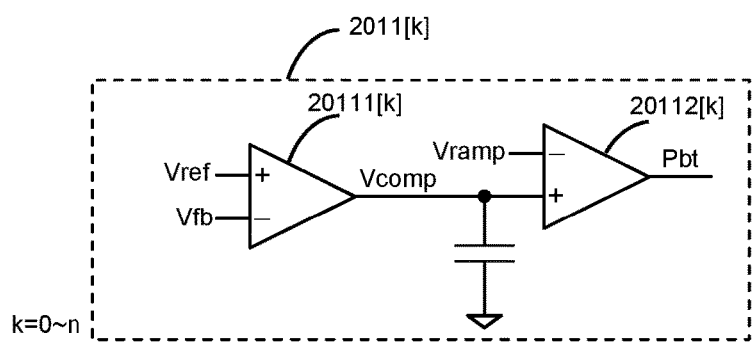
FIG. 4 shows an embodiment of a loop control unit in a scalable multi-phase switching converter according to the present invention.

Please refer to FIG. 4, which shows an embodiment of a loop control unit in a scalable multi-phase switching converter according to the present invention. FIG. 4 shows an embodiment of a loop control unit 2011[k], which is an illustrative example, but not for limiting the broadest scope of the present invention. As shown in FIG. 4, in one embodiment, the loop control unit 2011[k] includes an amplifier 20111[k] and a comparator 20112[k]. A non-reverse input end of the amplifier 20111[k] is coupled to a reference voltage Vref, whereas, a reverse input end of the amplifier 20111[k] is coupled to a feedback signal Vfb. The amplifier 20111[k] is configured to operably generate an error compensation signal Vcomp according to a difference between the reference voltage Vref and the feedback signal Vfb. The comparator 20112[k] is configured to operably compare the error compensation signal Vcomp with a ramp signal Vramp, so as to generate the basic trigger pulse Pbt. Please refer to FIG. 4 in conjugation with FIG. 7. In master operation mode, when the error compensation signal Vcomp is greater than the ramp signal Vramp, the comparator 20112[k] enables the basic trigger pulse Pbt, to thereby enable a multi-phase trigger pulse signal Ptrig.

Figure 5:
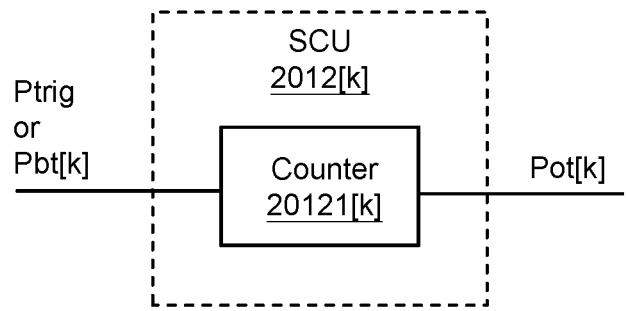
FIG. 5 shows an embodiment of a switching control unit in a scalable multi-phase switching converter according to the present invention.

Please refer to FIG. 5, which shows an embodiment of a switching control unit in a scalable multi-phase switching converter according to the present invention. As shown in FIG. 5, in one embodiment, the switching control unit 2012[k] includes a counter 20121[k]. In master operation mode or in slave operation mode, the counter 20121[k] of the switching control unit 2012[k] is configured to operably count a pulse serial order of the multi-phase trigger pulse signal Ptrig, and to control the power switches (e.g., as shown by power switches A[k] and B[k]) corresponding to the counted pulse serial order of the multi-phase trigger pulse signal Ptrig.

Figure 6:
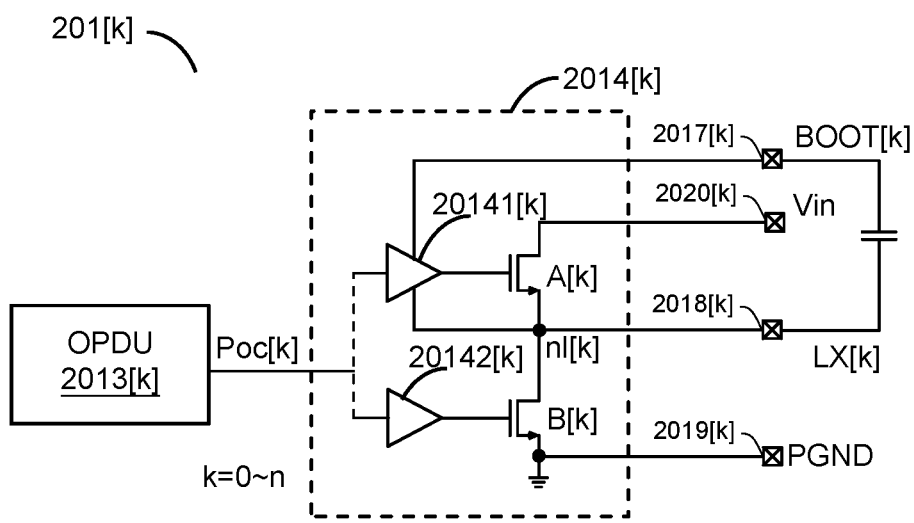
FIG. 6 shows an embodiment of a driver switch unit in a scalable multi-phase switching converter according to the present invention.

Please refer to FIG. 6, which shows an embodiment of a driver switch unit (i.e., driver switch unit 2014[k]) in a scalable multi-phase switching converter according to the present invention. The driver switch unit 2014[k] is an illustrative example, but not for limiting the broadest scope of the present invention. As shown in FIG. 6, in one embodiment, the driver switch unit 2014[k] includes drivers 20141[k] and 20142[k], and power switches A[k] and B[k], wherein the power switch A[k] corresponds to the driver 20141[k], while, the power switch B[k] corresponds to the driver 20142[k]. An output end of the driver 20141[k] is coupled to a gate of the power switch A[k], whereas, an output end of the driver 20142[k] is coupled to a gate of the power switch B[k]. A positive power supply end of the driver 20141[k] is coupled to a bootstrap voltage level BOOT[k] via a driving power supply pin 2017[k]. On the other hand, a negative power supply end of the driver 20141[k], a source of the power switch A[k] and a drain of the power switch B[k] are commonly coupled to a node nl[k]. The node nl[k] is coupled to a switching node LX[k] via a switching pin 2018[k]. An input end of the driver 20141[k] and an input end of the driver 20142[k] are coupled to the ON-period determination unit 2013[k], so that the driver 20141[k] and the driver 20142[k] can generate corresponding driving signals according to the conduction control pulse Poc[k]. A drain of the power switch A[k] receives an input voltage Vin via a power supply input end 2020[k], whereas, a source of the power switch B[k] is coupled to a ground level PGND via a ground pin 2019[k]. In this embodiment, the driver switch unit 2014[k] is configured to operably switch a voltage at the node nl[k] between the input voltage Vin and the ground level PGND. In other words, as shown in FIG. 2, the driver switch unit 2014[k] of this embodiment can cooperate with the inductor L[k] to form a buck switching converter.

Please refer to FIG. 7, which illustrates a signal waveform diagram depicting the operation of a scalable multi-phase switching converter of FIG. 2. To be more specific, FIG. 7 illustrates signal waveforms of the ramp signal Vramp, the error compensation signal Vcomp, the multi-phase trigger pulse signal Ptrig, and the voltages at switching nodes LX[1]~LX[4]. As shown in FIG. 7, by counting a pulse serial order of the multi-phase trigger pulse signal Ptrig, the power switches are triggered to switch at time points when corresponding pulses in the multi-phase trigger pulse signal Ptrig are triggered, thus switching the voltages at switching nodes LX[1]~LX[4]. To give an example, referring to FIG. 2 and FIG. 8A, the converter module 201[2] which operates in slave operation mode has an order of 3rd in the phase serial order (i.e., S2); therefore, when a third pulse in the multi-phase trigger pulse signal Ptrig is triggered, the converter module 201[2] will generate an ON-trigger pulse Pot[2] and a conduction control pulses Poc[2], to control the power switches to switch the voltage at the switching node LX[2]. In an embodiment wherein a counter is employed (e.g., the embodiment of FIG. 5), when the counter counts to the third pulse, the multi-phase trigger pulse signal Ptrig is triggered.

It is worthwhile mentioning that, the scalable multi-phase switching converter according to the present invention is particularly suitable for use in a switching converter operating by constant ON-period. Under such circumstance, as shown in FIG. 7, when the loading condition or the input voltage Vin varies, in response, the frequency of the ON-pulses can change. In other words, the scalable multi-phase switching converter according to the present invention is capable of executing multi-phase switching operation with non-constant frequency.

Figure 9:
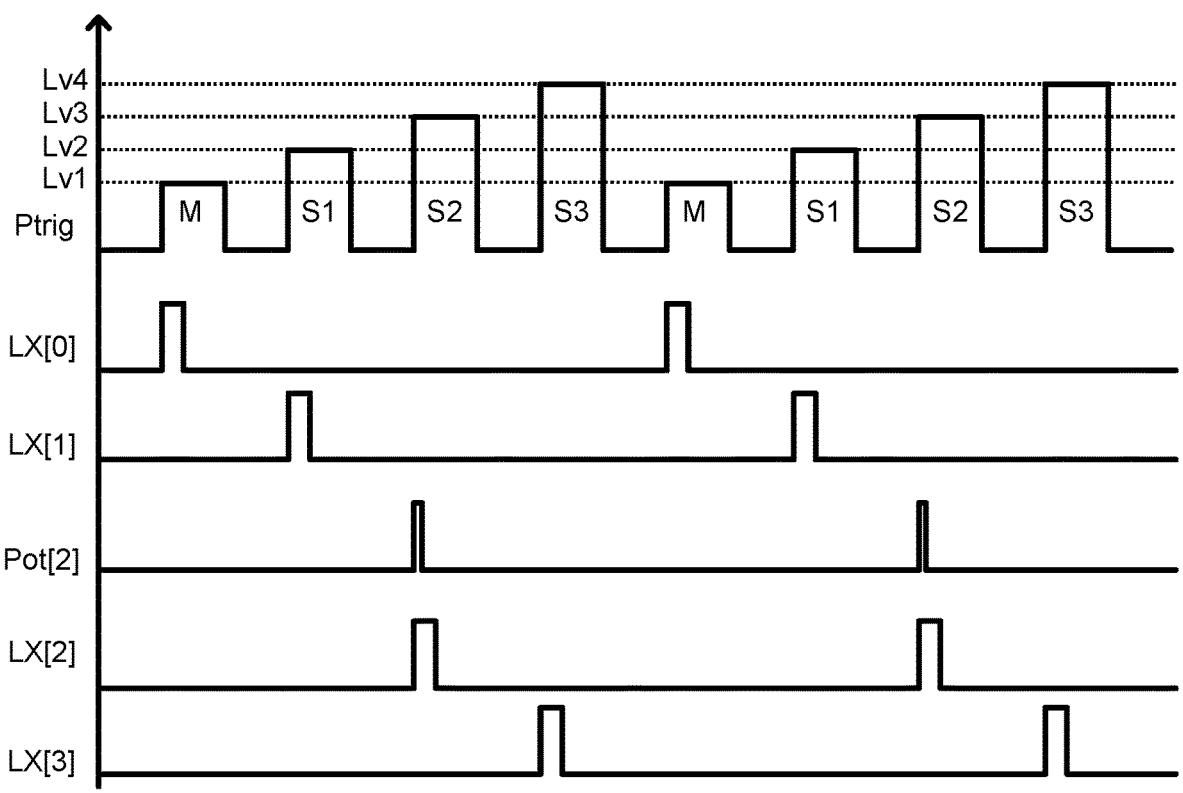
FIG. 9 illustrates a signal waveform diagram, showing a multi-phase trigger pulse signal of a scalable multi-phase switching converter according to an embodiment of the present invention.

Please refer to FIG. 9, which illustrates a signal waveform diagram, showing a multi-phase trigger pulse signal of a scalable multi-phase switching converter according to an embodiment of the present invention. In one embodiment, the phase serial order of a converter module 201[k] can be arranged to correspond to a predetermined level range. As such, the converter module 201[k] can judge whether the level of the multi-phase trigger pulse signal Ptrig when the multi-phase trigger pulse signal Ptrig is enabled falls within the predetermined level range, so as to determine whether to trigger the ON-trigger pulse Pot[k]. To give an example, referring to FIG. 9, the total number of operation phases is four in this example, and the converter modules 201[0]~201[3] operating in master operation mode and in slave operation mode respectively correspond to predetermined level ranges Lv1~Lv4; each switching control unit 2011[k] (wherein k=0~3) compares the level of the multi-phase trigger pulse signal Ptrig with the predetermined level ranges Lv1~Lv4, to determine a time point at which the corresponding ON-trigger pulse Pot[0]~Pot[3] is triggered. To give a more specific example, the converter module 201[2] has a phase serial order of 3rd, so when the level of the multi-phase trigger pulse signal Ptrig falls within (i.e., corresponds to) the predetermined level range Lv3, the ON-trigger pulse Pot[2] is triggered, so as to switch the voltage at the switching node LX[2]. The other phases operate in a similar manner.

Figure 10:
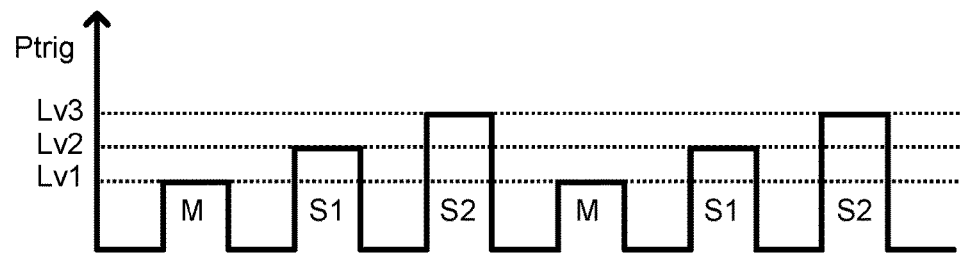
FIG. 10 illustrates a signal waveform diagram, showing a multi-phase trigger pulse signal of a scalable multi-phase switching converter according to another embodiment of the present invention.

Please refer to FIG. 10, which illustrates a signal waveform diagram, showing a multi-phase trigger pulse signal of a scalable multi-phase switching converter according to another embodiment of the present invention. As shown in FIG. 10, in master operation mode, the converter module 201[0] can dynamically adjust the number of operation phases of the scalable multi-phase switching converter 20 by controlling the levels of the multi-phase trigger pulse signal Ptrig. For example, as compared to the embodiment shown in FIG. 9 wherein the total number of operation phases is four, this embodiment shown in FIG. 10 dynamically adjusts the total number of operation phases to three. In other words, in the embodiment of FIG. 10, because the levels of the multi-phase trigger pulse signal Ptrig only correspond to a first operation phase, a second operation phase and a third operation phase, even if there are a fourth or more operation phases, these operation phases will not operate to perform conversion, but will for example enter into a high impedance state.

Figure 11:
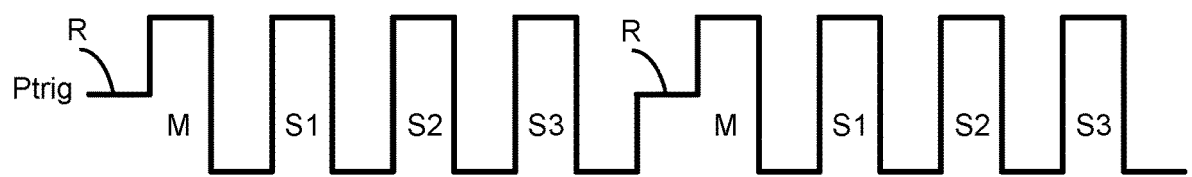
FIG. 11 illustrates a signal waveform diagram, showing a multi-phase trigger pulse signal of a scalable multi-phase switching converter according to another embodiment of the present invention.

Please refer to FIG. 11, which illustrates a signal waveform diagram, showing a multi-phase trigger pulse signal of a scalable multi-phase switching converter according to yet another embodiment of the present invention. This embodiment of FIG. 11 for example corresponds to the switching control unit 2012[k] shown in FIG. 5. In this embodiment, each converter module 201[k] is configured to operably count a serial order of pulses in the multi-phase trigger pulse signal Ptrig by a corresponding counter 20121[k], so as to trigger an ON-trigger pulse Pot[k] at a pulse of a corresponding order in the multi-phase trigger pulse signal Ptrig. In the embodiment of FIG. 11, the total number of operation phases is four; each switching control unit 2012[k] operating in master operation mode or in slave operation mode counts a serial order of pulses in the multi-phase trigger pulse signal Ptrig, and controls the power switches accordingly when a pulse of a corresponding serial order in the multi-phase trigger pulse signal Ptrig is triggered. As shown in FIG. 11, the multi-phase trigger pulse signal Ptrig includes a reset state R. The converter module 201[k] is configured to operably reset the counted serial order according to the reset state R. As shown in FIG. 11, in one embodiment, the switching control unit 2012[k] operating in master operation mode controls the multi-phase trigger pulse signal Ptrig to be at a high impedance state in response to the reset state R. As shown in FIG. 11, in one embodiment, a reset state R is inserted between every two multi-phase cycles of pulses (i.e., (M, S1, S2, S3), "R", (M, S1, S2, S3), "R", . . . ).

Figure 12:
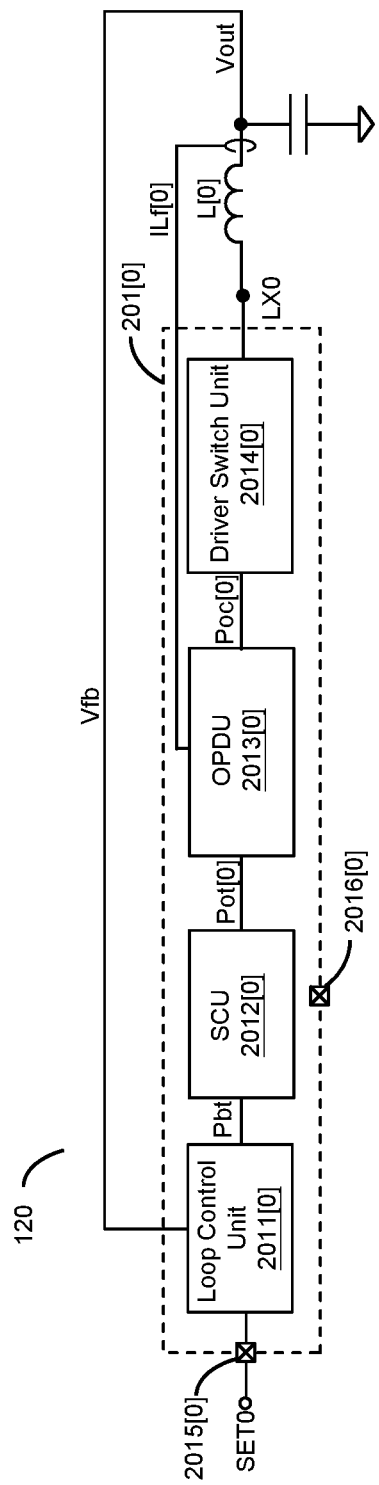
FIG. 12 shows an embodiment of a single-phase converter module in a scalable multi-phase switching converter according to the present invention.

Please refer to FIG. 12, which shows an embodiment of a single-phase converter module in a scalable multi-phase switching converter according to the present invention. To be more specific, FIG. 12 shows an embodiment wherein a scalable multi-phase switching converter is implemented to operate in single-phase operation mode or operating in master operation mode. In one embodiment, the switching control unit 2012[0] is determined to operate in single-phase operation mode according to a setting signal SET[0] in setting mode; in the single-phase operation mode, the switching control unit 2012[0] generates an ON-trigger pulse Pot[0] according to a basic trigger pulse Pbt. In one embodiment, the operation mechanism in single-phase operation mode is similar to the operation mechanism in master operation mode, but is different in that: in the single-phase operation mode, it is not required for the switching control unit 2012[0] to output a multi-phase trigger pulse signal Ptrig at a trigger pin.

Figure 13A:
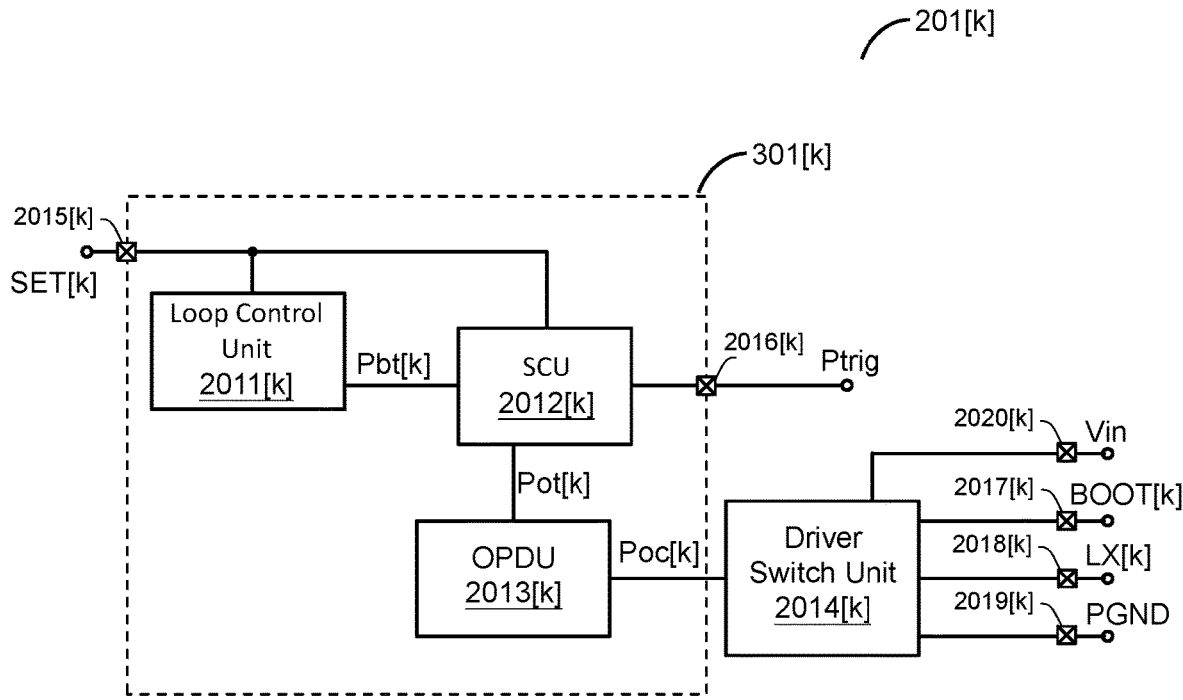
FIG. 13A shows an embodiment of a converter module in a scalable multi-phase switching converter according to the present invention.
Figure 13B:
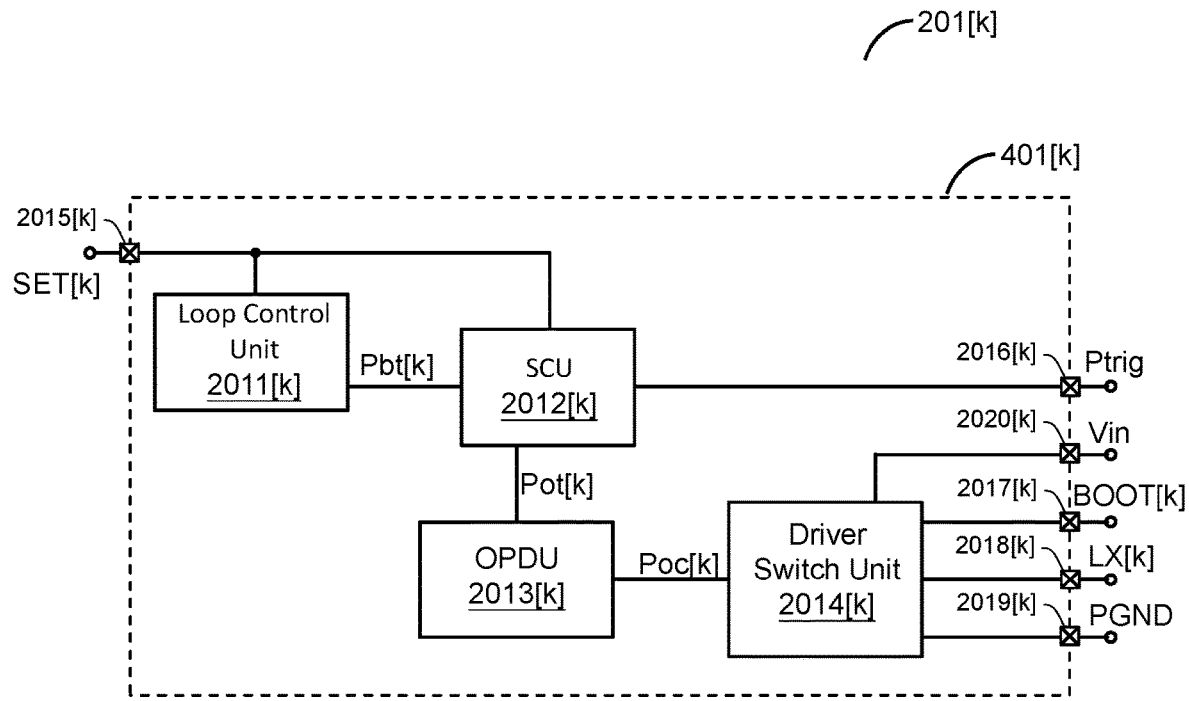
FIG. 13B shows another embodiment of a converter module in a scalable multi-phase switching converter according to the present invention.

Please refer to FIG. 13A and FIG. 13B, which show two embodiments of a converter module in a scalable multi-phase switching converter according to the present invention, respectively. As shown in FIG. 13A, in one embodiment, the loop control unit 2011[k], the switching control unit 2012[k], the ON-period determination unit 2013[k], the setting pin 2015[k] and the trigger pin 2016[k] of the converter module 201[k] are packaged into an integrated circuit (IC) package 301[k]. In one embodiment, the loop control unit 2011[k], the switching control unit 2012[k], the ON-period determination unit 2013[k], the setting pin 2015[k] and the trigger pin 2016[k] of the converter module 201[k] are integrated into an IC chip.

As shown in FIG. 13B, in another embodiment, the loop control unit 2011[k], the switching control unit 2012[k], the ON-period determination unit 2013[k], the driver switch unit 2014[k], the setting pin 2015[k] and the trigger pin 2016[k] of the converter module 201[k] are packaged into an IC package 401[k]. In one embodiment, the loop control unit 2011[k], the switching control unit 2012[k], the ON-period determination unit 2013[k], the driver switch unit 2014[k], the setting pin 2015[k] and the trigger pin 2016[k] of the converter module 201[k] are integrated into an IC chip. In one embodiment, the IC package 301[k] or 401[k] includes a setting pin 2015[k] and a trigger pin 2016[k] for communication with an external circuit outside the IC package 301[k] or 401[k].

As described above, the present invention provides a scalable multi-phase switching converter and a converter module and a control method thereof. Advantages of the present invention include: that the present invention can execute control operation via one single trigger signal; that the present invention can operate to generate output by a non-constant frequency, wherein one converter module operating in master operation mode can provide the trigger signal to another converter module operating in slave operation mode according to loop response; that a setting signal can be inputted via an extra pin or a digital interface.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A scalable multi-phase switching converter, comprising:
    a plurality of converter modules, which are correspondingly coupled to a plurality of inductors and which are configured to operably convert an input voltage to an output voltage by alternating multi-phase switching, wherein the plurality of converter modules are operable in and switchable among a plurality of operation modes, wherein each converter module includes:
        a loop control unit, which is configured to operably generate a basic trigger pulse according to a feedback signal in master operation mode;
        a setting pin, which is configured to operably receive a setting signal;
        a trigger pin, which is configured to operably transmit or receive a multi-phase trigger pulse signal;
        a switching control unit, which is configured to operably determine an operation mode and a phase serial order according to the setting signal in a setting mode, and wherein in master operation mode, the switching control unit is configured to operably generate the multi-phase trigger pulse signal at the trigger pin according to the basic trigger pulse, and wherein in slave operation mode, the switching control unit is configured to operably receive the multi-phase trigger pulse signal at the trigger pin, and wherein the switching control unit is configured to operably generate an ON-trigger pulse according to the multi-phase trigger pulse signal and the phase serial order; and
        an ON-period determination unit, which is configured to operably generate a conduction control pulse according to the ON-trigger pulse, so as to control a corresponding one of the inductors to generate the output voltage;
    wherein the trigger pins of the converter modules are coupled to each other.

2. The scalable multi-phase switching converter of claim 1, wherein each converter module further includes:
    a driver switch unit including: a plurality of power switches, which are coupled to a corresponding inductor and which are controlled according to the conduction control pulse, so as to control the corresponding inductor to generate the output voltage.

3. The scalable multi-phase switching converter of claim 1, wherein the conduction control pulse has a constant ON-period.

4. The scalable multi-phase switching converter of claim 3, wherein the ON-period determination unit is further configured to operably adjust the constant ON-period according to a current of the corresponding inductor, so that the currents of the plurality of inductors achieve current balance among one another.

5. The scalable multi-phase switching converter of claim 1, wherein the trigger pin of each converter module is one and the only one trigger pin of the converter module, and wherein the multi-phase trigger pulse signal is the only one multi-phase trigger signal received by the converter module.

6. The scalable multi-phase switching converter of claim 1, wherein the feedback signal is correlated with the output voltage.

7. The scalable multi-phase switching converter of claim 1, wherein the phase serial order of each converter module operating in master operation mode or in slave operation mode corresponds to a predetermined level range, wherein the switching control unit corresponding to the converter module is configured to operably compare a level of the multi-phase trigger pulse signal with the predetermined level range, so as to determine a time point to trigger the ON-trigger pulse.

8. The scalable multi-phase switching converter of claim 7, wherein the converter module operating in master operation mode is configured to dynamically adjust a number of operation phases of the scalable multi-phase switching converter by controlling the level of the multi-phase trigger pulse signal.

9. The scalable multi-phase switching converter of claim 2, wherein each switching control unit operating in master operation mode or in slave operation mode is configured to operably count a serial order of pulses in the multi-phase trigger pulse signal, and control the corresponding power switches when a pulse of a corresponding serial order in the multi-phase trigger pulse signal is triggered.

10. The scalable multi-phase switching converter of claim 9, wherein the multi-phase trigger pulse signal includes a reset state, wherein each converter module is configured to operably reset the counted serial order according to the reset state.

11. The scalable multi-phase switching converter of claim 10, wherein the switching control unit operating in master operation mode is configured to operably control the multi-phase trigger pulse signal to be at a high impedance state in response to the reset state.

12. The scalable multi-phase switching converter of claim 11, wherein a reset state is inserted between every two multi-phase cycles of pulses.

13. The scalable multi-phase switching converter of claim 1, wherein the converter module operating in master operation mode is further configured to operably determine a total number of operation phases of the scalable multi-phase switching converter according to the setting signal.

14. The scalable multi-phase switching converter of claim 1, wherein the converter module operating in master operation mode is further configured to adaptively adjust a total number of operation phases of the scalable multi-phase switching converter according to an output current.

15. The scalable multi-phase switching converter of claim 1, wherein each converter module is packaged into an integrated circuit (IC) package, wherein the IC package includes: the setting pin and the trigger pin, for communication with an external circuit outside the IC package.

16. The scalable multi-phase switching converter of claim 2, wherein each converter module is packaged into an integrated circuit (IC) package, wherein the IC package includes: the setting pin and the trigger pin, for communication with an external circuit outside the IC package.

17. The scalable multi-phase switching converter of claim 1, wherein the loop control unit in slave operation mode is controlled to be disabled.

18. A converter module, which is configured to form a scalable single-phase switching converter or a scalable multi-phase switching converter, wherein the converter module is coupled to an inductor so as to convert an input voltage to an output voltage;
the converter module comprising:
a loop control unit, which is configured to operably generate a basic trigger pulse according to a feedback signal in master operation mode;
a setting pin, which is configured to operably receive a setting signal;
a trigger pin, which is configured to operably transmit or receive a multi-phase trigger pulse signal;
a switching control unit, which is configured to operably determine an operation mode and a phase serial order according to the setting signal in a setting mode, and wherein in master operation mode, the switching control unit is configured to operably generate the multi-phase trigger pulse signal at the trigger pin according to the basic trigger pulse, and wherein in slave operation mode, the switching control unit is configured to operably receive the multi-phase trigger pulse signal at the trigger pin, and wherein the switching control unit is configured to operably generate an ON-trigger pulse according to the multi-phase trigger pulse signal and the phase serial order; and
an ON-period determination unit, which is configured to operably generate a conduction control pulse according to the ON-trigger pulse, so as to control a corresponding one of the inductors to generate the output voltage.

19. The converter module of claim 18, further comprising:
a driver switch unit including: a plurality of power switches, which are coupled to a corresponding inductor and which are controlled according to the conduction control pulse, so as to control the corresponding inductor to generate the output voltage.

20. The converter module of claim 18, wherein the conduction control pulse has a constant ON-period.

21. The converter module of claim 18, wherein the trigger pin of each converter module is one and the only one trigger pin of the converter module, and wherein the multi-phase trigger pulse signal is the only one multi-phase trigger signal received by the converter module.

22. The converter module of claim 18, wherein the phase serial order of each converter module operating in master operation mode or in slave operation mode corresponds to a predetermined level range, wherein the switching control unit corresponding to the converter module is configured to operably compare a level of the multi-phase trigger pulse signal with the predetermined level range, so as to determine a time point to trigger the ON-trigger pulse.

23. The converter module of claim 22, wherein the converter module operating in master operation mode is configured to dynamically adjust a number of operation phases of the scalable multi-phase switching converter by controlling the level of the multi-phase trigger pulse signal.

24. The converter module of claim 19, wherein each switching control unit operating in master operation mode or in slave operation mode is configured to operably count a serial order of pulses in the multi-phase trigger pulse signal, and control the corresponding power switches when a pulse of a corresponding serial order in the multi-phase trigger pulse signal is triggered.

25. The converter module of claim 24, wherein the multi-phase trigger pulse signal includes a reset state, wherein each converter module is configured to operably reset the counted serial order according to the reset state.

26. The converter module of claim 25, wherein the switching control unit operating in master operation mode is configured to operably control the multi-phase trigger pulse signal to be at a high impedance state in response to the reset state.

27. The converter module of claim 18, wherein the converter module operating in master operation mode is further configured to operably determine a total number of operation phases of the scalable multi-phase switching converter according to the setting signal.

28. The converter module of claim 18, wherein the converter module operating in master operation mode is further configured to adaptively adjust a total number of operation phases of the scalable multi-phase switching converter according to an output current.

29. The converter module of claim 18, wherein each converter module is packaged into an integrated circuit (IC) package, wherein the IC package includes: the setting pin and the trigger pin, for communication with an external circuit outside the IC package.

30. The converter module of claim 19, wherein each converter module is packaged into an integrated circuit (IC) package, wherein the IC package includes: the setting pin and the trigger pin, for communication with an external circuit outside the IC package.

31. The converter module of claim 18, wherein the loop control unit in slave operation mode is controlled to be disabled.

32. The converter module of claim 18, wherein in the setting mode, the switching control unit is further configured to operably determine the operation mode as a single-phase operation mode according to the setting signal, wherein in the single-phase operation mode, the switching control unit is configured to operably generate the ON-trigger pulse according to the basic trigger pulse.

33. A control method configured to operably control a scalable multi-phase switching converter, wherein the scalable multi-phase switching converter includes: a plurality of converter modules, which are correspondingly coupled to a plurality of inductors so as to operably convert an input voltage to an output voltage by alternating multi-phase switching; the control method comprising:
in a setting mode, receiving a setting signal from a setting pin and determining an operation mode and a phase serial order according to the setting signal;
in master operation mode, generating a basic trigger pulse according to a feedback signal and generating a multi-phase trigger pulse signal at a trigger pin according to the basic trigger pulse;
in slave operation mode, receiving the multi-phase trigger pulse signal at the trigger pin;
generating an ON-trigger pulse according to the multi-phase trigger pulse signal and the phase serial order; and generating a conduction control pulse according to the ON-trigger pulse, so as to control the plurality of inductors to generate the output voltage.

34. The control method of claim 33, wherein the conduction control pulse has a constant ON-period.

35. The control method of claim 33, wherein the trigger pin of each converter module is one and the only one trigger pin of the converter module, and wherein the multi-phase trigger pulse signal is the only one multi-phase trigger signal received by the converter module.

36. The control method of claim 33, wherein the phase serial order of each converter module operating in master operation mode or in slave operation mode corresponds to a predetermined level range, wherein the step of generating the ON-trigger pulse includes:
comparing a level of the multi-phase trigger pulse signal with the predetermined level range, so as to determine a time point to trigger the ON-trigger pulse.

37. The control method of claim 33, wherein the step of generating the ON-trigger pulse includes:
in master operation mode or in slave operation mode, counting a serial order of pulses in the multi-phase trigger pulse signal, so as to control corresponding power switches when a pulse of a corresponding serial order in the multi-phase trigger pulse signal is triggered.

38. The control method of claim 33, wherein the multi-phase trigger pulse signal includes a reset state, wherein each converter module is configured to operably reset the counted serial order according to the reset state.

* * * * *